United States Patent
Shanley, IV et al.

(10) Patent No.: US 10,071,523 B2
(45) Date of Patent: Sep. 11, 2018

(54) APPARATUS AND METHODS FOR CONTROLLING PRESSURE ON A THERMOFORMING ASSISTIVE DEVICE

(71) Applicant: William C. Shanley, IV, Malvern, PA (US)

(72) Inventors: William C. Shanley, IV, Malvern, PA (US); Robert L. Browning, Atlanta, GA (US)

(73) Assignee: William C. Shanley, IV, Malvern, PA (US)

( * ) Notice: Subject to any disclaimer, the term of this patent is extended or adjusted under 35 U.S.C. 154(b) by 278 days.

(21) Appl. No.: 14/689,235

(22) Filed: Apr. 17, 2015

(65) Prior Publication Data
US 2015/0306809 A1   Oct. 29, 2015

Related U.S. Application Data

(60) Provisional application No. 61/984,116, filed on Apr. 25, 2014.

(51) Int. Cl.
| | |
|---|---|
| *B29C 51/38* | (2006.01) |
| *B29C 51/18* | (2006.01) |
| *B29C 51/42* | (2006.01) |
| *B29C 51/26* | (2006.01) |
| *B29L 31/00* | (2006.01) |

(52) U.S. Cl.
CPC .......... *B29C 51/421* (2013.01); *B29C 51/262* (2013.01); *B29C 51/18* (2013.01); *B29L 2031/772* (2013.01)

(58) Field of Classification Search
CPC ..... B29C 51/421; B29C 51/262; B29C 51/18; B29L 2031/772
USPC ........ 264/554, 553, 322, 319; 425/553, 554, 425/403.1; 428/187, 178
See application file for complete search history.

(56) References Cited

U.S. PATENT DOCUMENTS

| | | | | | |
|---|---|---|---|---|---|
| 2,874,751 | A | * | 2/1959 | Norton | B29C 33/02 100/319 |
| 3,256,375 | A | * | 6/1966 | Bolelli | B27N 5/02 264/112 |
| 4,009,981 | A | * | 3/1977 | Rosen | B29C 51/10 425/384 |
| 4,079,232 | A | * | 3/1978 | Brokoff | B29C 35/02 100/320 |
| 4,179,252 | A | * | 12/1979 | Seufert | B29C 53/06 220/839 |
| 4,394,342 | A | * | 7/1983 | Mercer | B29C 51/00 264/292 |
| 4,533,555 | A | * | 8/1985 | Harris | B29C 51/082 425/384 |
| 4,942,012 | A | * | 7/1990 | Lee | B29C 51/14 264/510 |
| 5,390,467 | A | * | 2/1995 | Shuert | B29C 51/10 156/292 |

(Continued)

FOREIGN PATENT DOCUMENTS

WO    WO2014147130 A1 *  9/2014   ............. B29C 70/46

*Primary Examiner* — Nahida Sultana
(74) *Attorney, Agent, or Firm* — Kilpatrick Townsend & Stockton LLP; Dean W. Russell

(57) ABSTRACT

Apparatus and methods of forming sheets of material are disclosed. Profile plates may be placed atop the sheets. Tabs attached to clamp frames may apply uniform pressure on the perimeters of the profile plates during the formation process.

11 Claims, 4 Drawing Sheets

(56) References Cited

U.S. PATENT DOCUMENTS

| | | | | |
|---|---|---|---|---|
| 5,470,641 A * | 11/1995 | Shuert | ............... | B29C 51/10 |
| | | | | 108/57.27 |
| 5,531,851 A * | 7/1996 | Lin | ............... | B29B 9/02 |
| | | | | 156/180 |
| 5,617,900 A * | 4/1997 | Weil | ............... | F16L 11/125 |
| | | | | 138/110 |
| 5,705,203 A * | 1/1998 | Andersen | ............... | B27N 3/002 |
| | | | | 249/115 |
| 6,182,486 B1 * | 2/2001 | Chuang | ............... | B29C 51/10 |
| | | | | 264/510 |
| 6,338,618 B1 * | 1/2002 | Van Ert | ............... | B29C 33/28 |
| | | | | 249/170 |
| 6,685,789 B1 * | 2/2004 | Wissing | ............... | B29C 51/10 |
| | | | | 156/212 |
| 8,727,763 B2 | 5/2014 | Shanley, IV | | |
| 2002/0079617 A1 * | 6/2002 | Kageyama | ............... | B29C 51/422 |
| | | | | 264/322 |
| 2003/0003250 A1 * | 1/2003 | Zeiter | ............... | B29C 51/04 |
| | | | | 428/35.8 |
| 2008/0131675 A1 * | 6/2008 | Fackler | ............... | B32B 27/08 |
| | | | | 428/213 |
| 2009/0039556 A1 * | 2/2009 | Sawada | ............... | B29C 51/082 |
| | | | | 264/319 |
| 2011/0290674 A1 * | 12/2011 | Shanley, IV | ............... | B29C 51/10 |
| | | | | 206/0.8 |
| 2013/0200551 A1 | 8/2013 | Shanley, IV et al. | | |
| 2015/0140251 A1 * | 5/2015 | Bartoli | ............... | B29C 51/262 |
| | | | | 428/43 |
| 2016/0046064 A1 * | 2/2016 | Sartor | ............... | B29C 70/46 |
| | | | | 264/132 |

* cited by examiner

APPARATUS AND METHODS FOR CONTROLLING PRESSURE ON A THERMOFORMING ASSISTIVE DEVICE

CROSS-REFERENCE TO RELATED APPLICATION

This application claims the benefit of and priority to U.S. Provisional Patent application Ser. No. 61/984,116, filed Apr. 25, 2014, entitled "Additional Apparatus for Controlling the Pressure of an Assist in Thermoforming" the entire contents of which are incorporated herein by this reference.

FIELD OF THE INVENTION

This invention relates principally to apparatus and methods for shaping heated polymeric materials in a mold and more particularly, although not necessarily exclusively, to devices assisting such thermoforming in manners improving uniformity of the resulting shaped products.

BACKGROUND OF THE INVENTION

Commonly-owned U.S. Pat. No. 8,727,763 to Shanley, I V (the "'763 Patent"), details apparatus and methods for, among other things, selectively thermoforming plastics. The apparatus may include a mold comprising "a generally planar upper surface from which one or more plugs protrude." in use, the "plugs function as three-dimensional objects about which sheets of polymer material are formed." See '763 Patent, col. 3, ll. 33-37.

Consistent with disclosure of the '763 Patent, a to-be-formed sheet may be placed between the upper surface of the mold and an energy sink. One such sink may comprise a generally planar plate with one or more cut-outs existing through its depth. Preferably, each cut-out "is approximately the size and shape of an associated plug" protruding from the upper surface of the mold. See id., col. 3, ll. 57-67; col. 4, ll. 29-32 and 49-51. To form portions of the sheet.

[a] heater is repositioned closely above [the] sink and activated for a selected period of time . . . . Heat or other energy from [the] heater transfers to [the] sink and, where cut-outs in [the] sink exist, to . . . areas of the sheet therewith aligned, where it is absorbed by the polymeric material [of the sheet].

As the exposed areas of the sheet absorb sufficient heat to reach their forming temperatures, [the] mold is evacuated so as to stretch (form) the material around [the] plugs. [The h]eater then may be repositioned away from [the] mold, the formed sheet of material may be allowed to cool, and [the] sink may be removed so as to expose the sheet of material.

See id., col. 4, ll. 53-65 (numerals omitted).

Commonly-owned U.S. Patent Application Publication No. 2013/0200551 to Shanley, I V, et al. (the "'551 Application") describes additional apparatus and methods for selective thermoforming. Included in apparatus of the '551 Application is a spacing device initially separating a sheet from the mold surface. In some versions the spacing device may be "in the form of a grid or support rail" designed to "support [the] sheet of polymeric material a substantially uniform distance from the mold surface while enabling a profile plate to block heat or other energy from an energy source to effect the selective thermoforming." See '551 Application, p. 1, ¶ 0006. As described in the '551 Application:

The grid further may be supported by springs or other biasing mechanisms and accepted by a receiver groove or recesses in the mold. When compressed by vacuum pressure and the force of the clamps, the grid may retract flush into the mold.

See id. The entire contents of both the '763 Patent and the '551 Application are incorporated herein by this reference.

The apparatus, systems, and methods of the '763 Patent and '551 Application work well for their intended purposes. At times, however, to-be-formed polymeric sheets may lack uniform thicknesses. Also, the profile plates or other energy sinks may be subject to (generally slight) warpage or bowing. Either or both issues may cause distortion of the formed products, even in their unprinted areas.

For example, unduly thick sheets may prevent satisfactory formation of the polymeric material around the plugs of the mold. By contrast, overly thin sheets may result in excessive thinning and consequent distortion of formed areas. Accordingly, sometimes need exists for enhancing uniformity of pressure placed on the sinks and sheets of polymeric material so as to help account for these issues.

SUMMARY OF THE INVENTION

The present invention satisfies this need. At least some versions of the invention may incorporate tabs onto clamp frames for this purpose. After a sheet is placed in the forming location on a mold and the profile plate is positioned atop the sheet, the clamp frames may close so as to maintain the positioning of the sheet. The tabs attached to the clamp frames apply uniform pressure on the perimeter of the profile plate, holding the profile plate on top of the sheet.

In these versions, the sheet may then be heated to forming temperature and the mold evacuated so that the sheet forms onto the mold surface. During this process, the tabs assist the profile plate by applying a downward pressure. The pressure helps ensure the profile plate remains in full contact with the sheet so as to assist its formation. The tabs additionally help prevent warping and bowing of the profile plate in the heating process.

The tabs may be made of spring steel or any other suitable material. Spring steel is presently preferred, however, based on its modulus of elasticity. The elasticity allows the profile plate to be retained in place without unduly straining or stressing the sheet material during the forming process.

It thus is an optional, non-exclusive object of the present invention to provide apparatus and methods for thermoforming polymeric materials.

It is also an optional, non-exclusive object of the present invention to provide apparatus and methods for enhancing uniformity of formation of polymeric materials.

It is a further optional, non-exclusive object of the present invention to provide apparatus and methods for employing assistive devices to promote such uniform formation.

It is an additional optional, non-exclusive object of the present invention to provide apparatus and methods in which the assistive devices may comprise tabs attached to clamp frames.

It is, moreover, an optional, non-exclusive object of the present invention to provide apparatus and methods in which the tabs are made of spring steel.

Other objects, features, and advantages of the invention will be apparent to persons skilled in the relevant art with reference to the remaining text and the drawings of this application.

DETAILED DESCRIPTION

Figure 1:
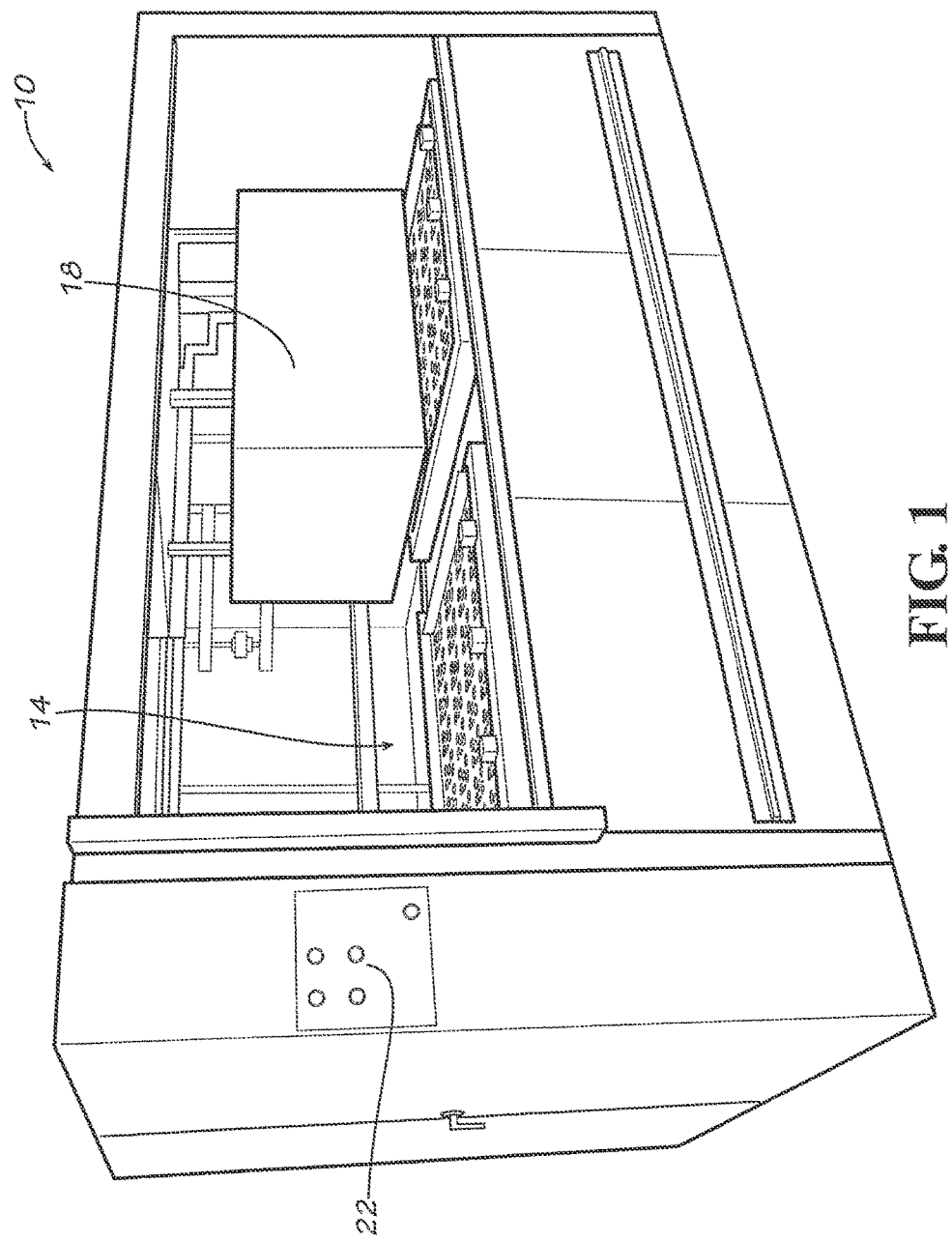
FIG. 1 is a perspective view of exemplary thermoforming apparatus useful as part of or in connection with the present invention.

Depicted in FIG. 1 is exemplary thermoforming apparatus 10. Apparatus 10 may be a conventional thermoforming machine, any number of which are available commercially. Preferably included as part of apparatus 10 are mold 14 (see also FIGS. 2 and 5) and heater 18. A computerized controller including actuating means 22 may, if desired, be connected to heater 18 to control aspects of its operation. Actuating means 22 may comprise one or more manual switches as shown in FIG. 1. Those skilled in relevant fields will recognize, however, that other manners of actuating heater 18 may be employed instead and that no controller is required.

Figure 2:
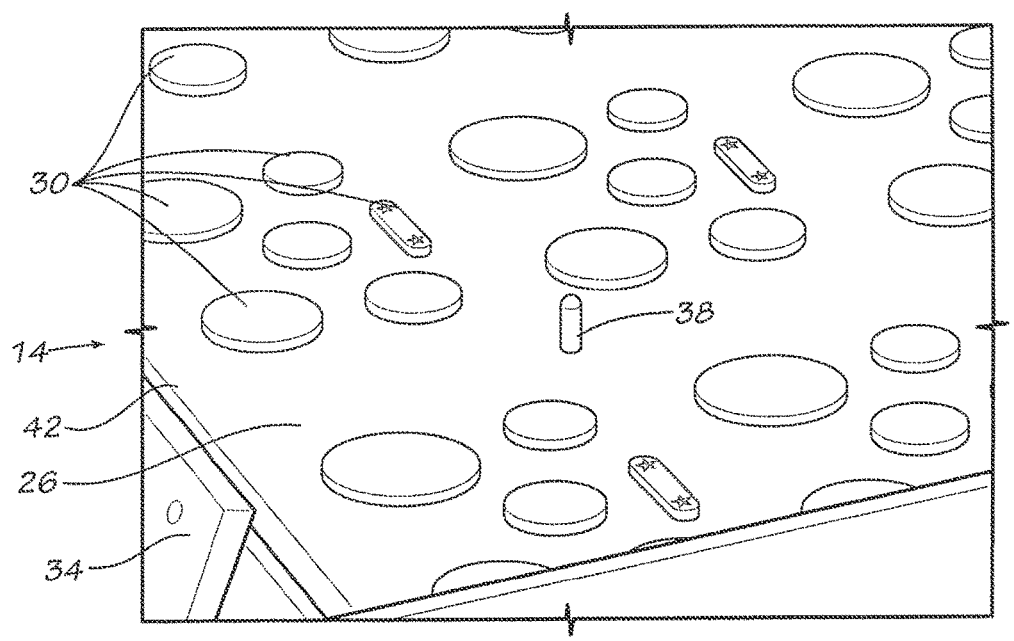
FIG. 2 is a close-up view of part of a mold portion of FIG. 1 illustrating especially various plugs protruding upward from its surface onto which a formable sheet may be placed.
Figure 5:
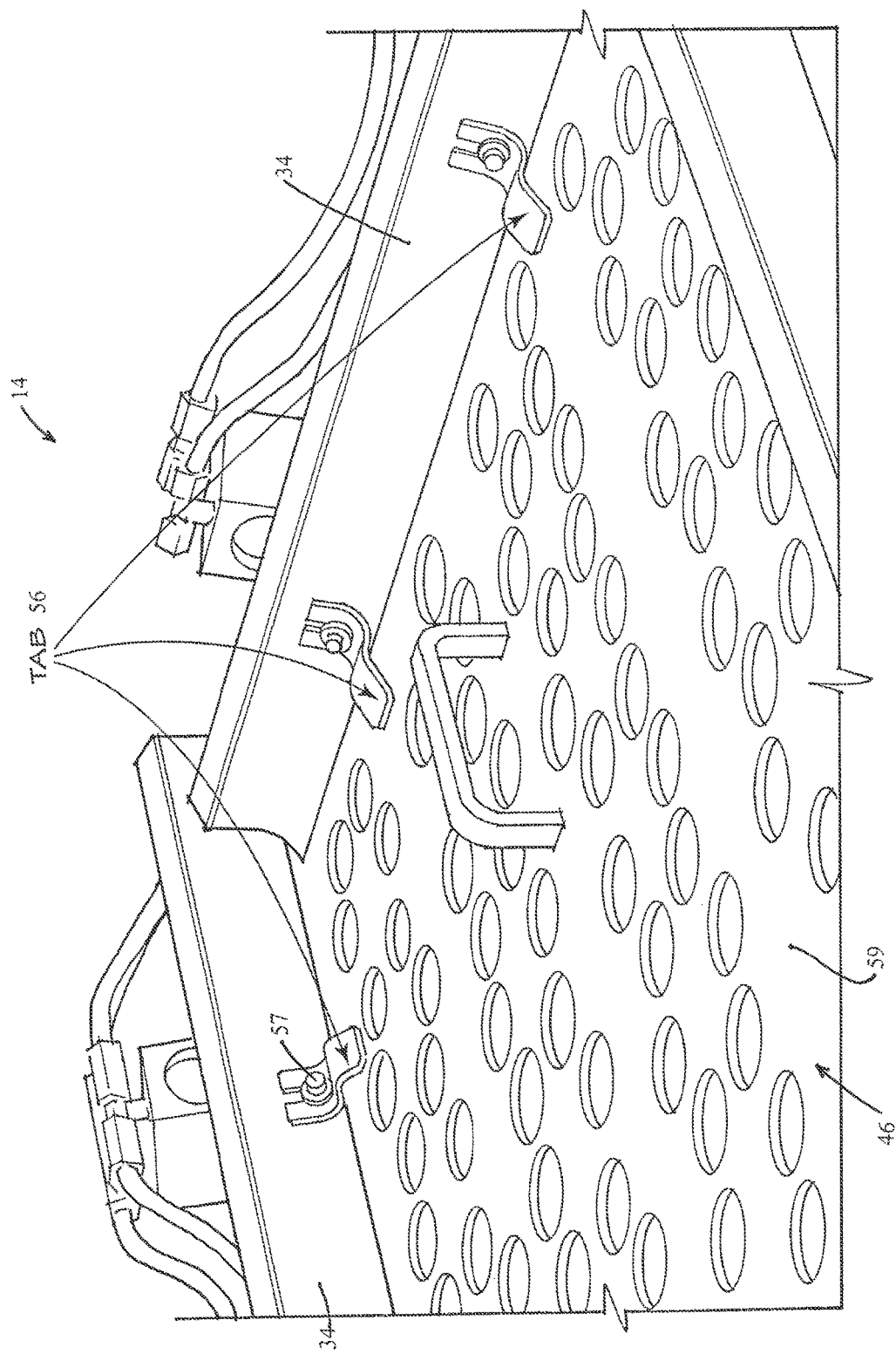
FIG. 5 is a perspective view of portions of the mold of FIGS. 2 and 4 comprising part of the apparatus of FIG. 1

Heater 18 preferably is positionable above mold 14 so as to supply heat only to one side of the mold 14, which itself may be heated. FIGS. 2 and 5 show aspects of an exemplary version of mold 14, which preferably (although not necessarily) is made of aluminum. Alternatively, mold 14 may be of composite type with both male and female components. As illustrated particularly in FIG. 2, mold 14 may comprise a generally planar upper surface 26 from which one or more plugs 30 protrude. In use of apparatus 10, plugs 30 function as three-dimensional objects about which sheets of polymer material are formed.

Also detailed in FIGS. 2 and 5 as part of mold 14 are clamps 34 and alignment pins 38. Clamps 34 surround some or all of perimeter 42 of mold 14 and retain to-be-formed material in place relative to upper surface 26. Pins 38, which like plugs 30 extend upward from upper surface 26, facilitate alignment of the to-be-formed material relative to the plugs 30.

Figure 3:
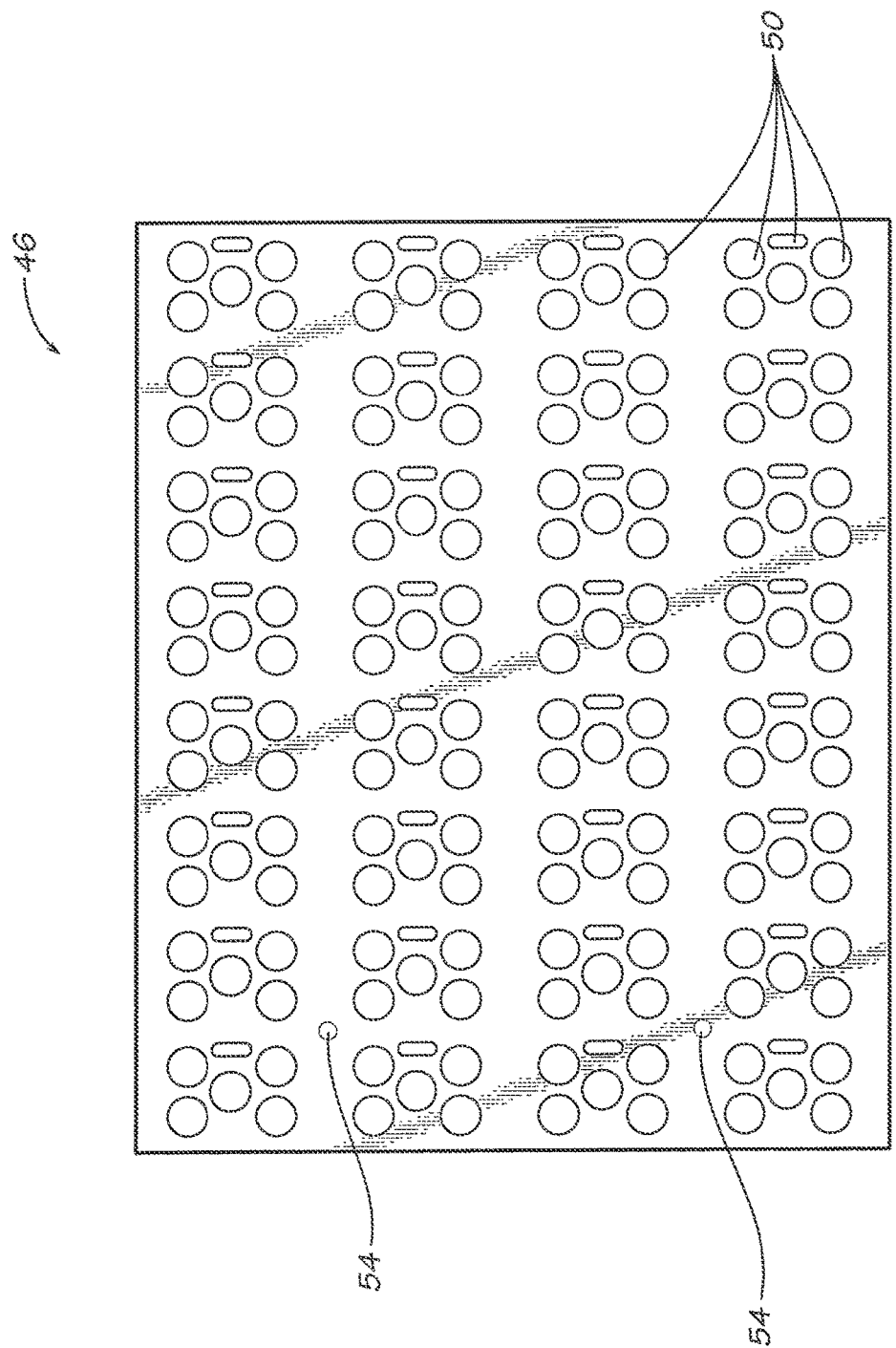
FIG. 3 is a generally elevational view of an exemplary profile plate that may be used as part of or in connection with the present invention.

An exemplary profile plate or sink 46 appears in FIG. 3. Sink 46 may be sized and shaped in any appropriate manner and may of any suitable heat-absorbing (or -reflecting) material. Preferably, however, sink 46 conforms to the shape of the corresponding mold or surface to be heated; as shown in FIG. 3, exemplary sink 14 is in the form of a generally rectangular, generally planar aluminum plate. Consistent with the present invention, sink 46 may include one or more cut-outs 50 through its depth, each of which preferably is approximately the size and shape of an associated plug 30. Sink 46 additionally may include openings 54 for receiving alignment pins 38.

Apparatus 10 may be utilized with any thermoformable material. For certain purposes identified herein, however, the material beneficially is polyethylene terephthalate ("PET"), a polymeric plastic resin. Additionally beneficial for various of these purposes is that the PET be transparent. Again, though, the thermoformable material need not necessarily be clear or transparent, nor need it be PET. For ease of handling, the material advantageously may be preformed into a generally planar sheet of predetermined size and shape.

Among products usefully created using the present inventive techniques are plastic display holders for coins or souvenirs. Collector-quality versions of such holders may, and indeed typically, include color printing, art work, and text in unformed regions. By contrast, formed regions—into which coins are placed—preferably remain clear so as not to impede viewing of the coins. In some cases the holders may be combined back-to-back or placed within clear housings for further protection of the coins. Objects other than coins or souvenirs may be displayed, and products other than display holders may be created, however, as should be apparent to persons skilled in the art.

According to at least one method of the present invention, mold 14 may be heated to a preset temperature. The temperature may be selected so as to allow thermoformable material to be formed by the mold 14 and so as to be sufficient to remove heat from the material. Preferably, however, the selected temperature is such that warping or chill marks will not be formed on or in the material.

After mold 14 is heated adequately, a sheet of material containing undistorted color printing, art work, or text (or combinations thereof) may be laid onto upper surface 26 of mold 14. For at least some display holders, up to six colors may be printed on each side of the sheet, with opaque material (text and art work) then printed over the printed colors. Of course, any or all of the printed matter may be omitted if not needed in the final product. Nevertheless, when present, the printed matter need not be pre-distorted, as it is not subject to material distortion during the forming process.

Assuming the above-described coin display holders are to be created, the sheet preferably contains openings through its depth for receiving alignment pins 38, with the openings themselves positioned so that, when pins 36 are received, unprinted (clear) areas of the sheet are positioned on upper surface 26 atop some or all of plugs 30. Clamps 34 may be employed to secure the periphery of the sheet against upper surface 26. Also, sink 46 may be placed atop the sheet, with its openings 54 likewise receiving alignment pins 38 and at least some of its cut-outs 50 aligned with clear areas of the sheet. So placing sink 46 effectively sandwiches the sheet between mold 14 and sink 46, precluding its longitudinal and lateral movement.

Illustrated in FIG. 5 is that one or more tabs 56 may be attached to one or more clamps 34. Such attachment may utilize bolts 57 or any other suitable fastener or connecting device. If more than one tab 56 is attached to a particular clamp 34, the tabs 56 preferably are spaced; FIG. 5, for example, depicts two such tabs 56 spaced along a particular clamp 34.

Although tabs 57 may be made of any appropriate material, they preferably are formed of spring steel. After the sheet is in place and sink 46 is positioned atop it, clamps 34 may close. This closure causes tabs 56 to contact upper surface 59 of sink 46, with the tabs 56 applying uniform (or substantially uniform) pressure on the perimeter area of sink 46 while assisting the clamps 34 in maintaining sink 46 atop the sheet. Downward pressure supplied by tabs 56 helps ensure sink 46 maintains complete contact with the sheet during forming. Tabs 56 additionally aid in preventing sink 46 from warping or bowing by holding it flat.

Following placement of the sheet relative to mold 14, heater 18 is repositioned closely above sink 46 and activated for a selected period of time. Continuing with the display holder example, heater 18 may be activated for approximately thirty seconds. Heat or other energy from heater 18 transfers to sink 46 and, where cut-outs 50 in sink 46 exist, to (clear) areas of the sheet therewith aligned, where it is absorbed by the polymeric, material.

Figure 4:
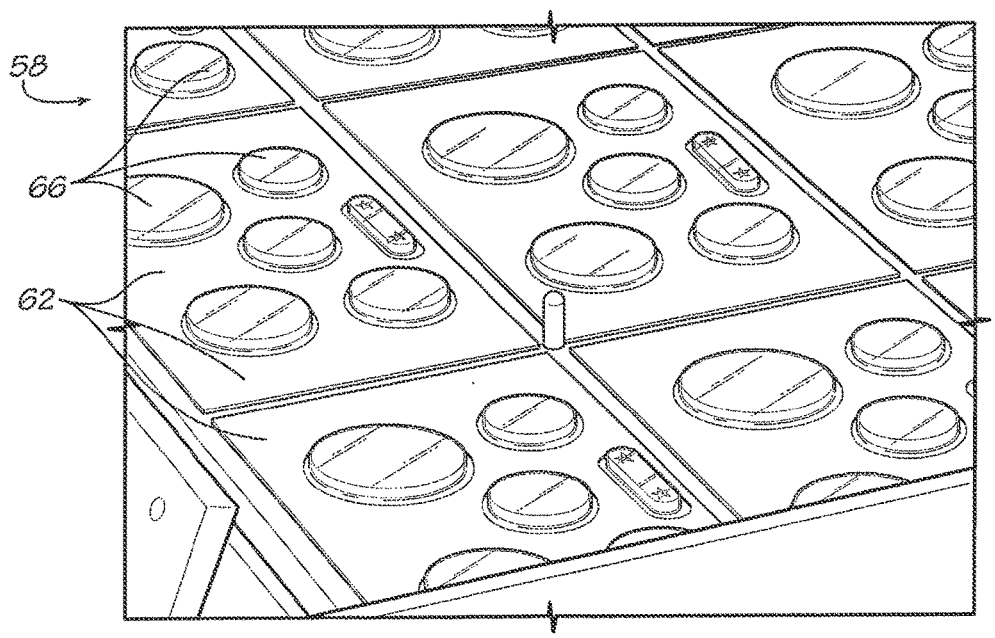
FIG. 4 is a close-up view illustrating a formed polymer sheet contacting the mold part of FIG. 2

As the exposed areas of the sheet absorb sufficient heat to reach their forming temperatures, mold 14 is evacuated so as to stretch (form) the material around plugs 30. Heater 18 then may be repositioned away from mold 14, the formed sheet of material may be allowed to cool, and sink 46 may be removed so as to expose the sheet of material. FIG. 4 illustrates material 58 in this exposed state, with the material 58 including (in this example) both unformed portions 62 and formed portions 66. The sheet of material 58 thereafter may be removed from mold 14 and, if appropriate, divided into display holders. Moreover, because only the periphery of material 58 was clamped during the forming process and need be trimmed, the vast remaining majority of the material 58 was available to create products. The processes of the invention may be repeated for any number of sheets of material.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A method for thermoforming a plastic material, comprising:
    a. positioning a plastic material atop a surface of a mold;
    b. positioning a metallic sink atop the plastic material, the metallic sink having an upper surface;
    c. clamping the metallic sink and plastic material to the mold, thereby causing at least one tab attached to a clamp to contact the upper surface of the metallic sink and apply downward pressure to the metallic sink, the at least one tab comprising spring steel; and
    d. forming the plastic material onto the surface of the mold.

2. A method for thermoforming a plastic material, comprising:
    a. positioning a plastic material atop a surface of a mold;
    b. positioning a metallic sink atop the plastic material;
    c. clamping the metallic sink and plastic material to the mold, thereby causing multiple tabs attached to a clamp to apply downward pressure to a perimeter area of the metallic sink, each tab of the multiple tabs comprising spring steel; and
    d. forming the plastic material onto the surface of the mold.

3. A method according to claim 2 in which the metallic sink has an upper surface and clamping the metallic sink and plastic material to the mold causes the multiple tabs to apply downward pressure to a perimeter area of the upper surface of the metallic sink.

4. A method according to claim 3 further comprising heating the mold to a preset temperature.

5. A method according to claim 4 in which positioning a plastic material atop a surface of a mold comprises laying the plastic material onto the upper surface of the mold after the mold is heated to the preset temperature.

6. A method according to claim 5 further comprising positioning a heater closely above the metallic sink and activating the heater for a selected period of time.

7. A method according to claim 6 further comprising repositioning the heater and allowing the plastic material to cool.

8. A method according to claim 7 further comprising removing the cooled plastic material from the mold.

9. A method according to claim 8 further comprising trimming a periphery of the cooled plastic material.

10. A method according to claim 2 in which clamping the metallic sink and plastic material to the mold thereby causes multiple tabs attached to multiple clamps to apply downward pressure to the perimeter area of the metallic sink.

11. A method for thermoforming a plastic material, comprising:
    a. positioning a plastic material atop a surface of a mold;
    b. positioning a metallic sink atop the plastic material, the metallic sink (i) having an upper surface and (ii) comprising a profile plate having a peripheral region bordering a central region, with the central region including cut-outs through its depth;
    c. clamping the metallic sink and plastic material to the mold, thereby causing at least one tab attached to a clamp to contact the upper surface of the metallic sink and apply downward pressure to the metallic sink, the at least one tab comprising spring steel;
    d. forming the plastic material onto the surface of the mold; and
    e. separating the metallic sink from the formed plastic material.

* * * * *